Sept. 10, 1929.  G. B. WADSWORTH  1,728,143
SWITCH BOX
Original Filed Oct. 11, 1917
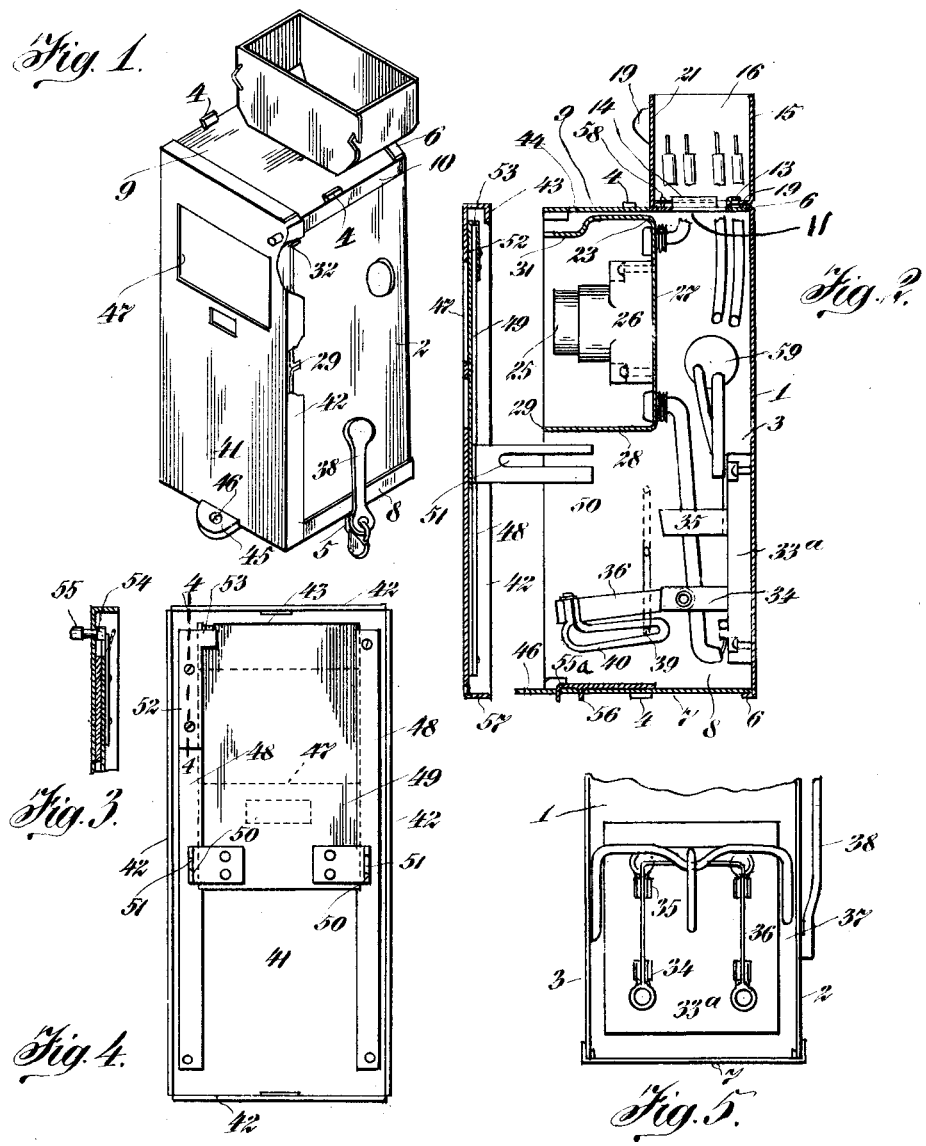
Inventor
George B Wadsworth
by Allen & Allen
Attorneys Patented Sept. 10, 1929.

1,728,143

UNITED STATES PATENT OFFICE.

GEORGE B. WADSWORTH, OF COVINGTON, KENTUCKY, ASSIGNOR TO THE WADSWORTH ELECTRIC MANUFACTURING COMPANY, OF COVINGTON, KENTUCKY, A CORPORATION OF KENTUCKY.

SWITCH BOX.

Original application filed October 11, 1917, Serial No. 196,023. Divided and this application filed October 6, 1921. Serial No. 505,696.

My invention has relation to safety switch boxes of the type which shut off the switch before exposing the fuses, and to devices of this nature more particularly where the switch cannot be closed without closing off the fuses as well. This case is a divisional application from my co-pending application filed October 11, 1917, Serial No. 196,023.

The great difficulty in making a market for safety switch boxes in ordinary domestic or commercial installation is the expense of the devices which have been hitherto devised. In the first place it is desirable in a switch box, if it be used for preventing theft of current from the fuses or switch points, that the lid be a sliding one. A hinged lid for the fuses is difficult to bring down tight enough to prevent a small wire being run out from the fuses.

Then again, a heavy cast box, or a box of the usual type wherein the parts are welded together, requires so much labor and material that the advantages to be gained by their use is to a large degree offset by the expense of manufacture.

It is the object of my invention to provide a switch box of the theft-preventing pattern, in which the parts are made of sheet metal in the fewest possible number, and in which the container portion of the box, including also the meter protector casing at the top of the box are struck out so as to be interlocking, and to make a pure assembly job without any soldering, riveting or the like.

It is also my object to provide a box which complies to the full with all present laws and rules of fire protection, and in which the usual knife blade pattern of switch may be used, and in which the fuse compartment is shut off entirely before the switch is closed.

Generally the object is to provide a box of the safety and theft-preventing pattern which can be put out cheaply and still provide the greatest possible number of advantageous features from the point of view of installation and use. Thus among other things, the wires may be connected up to my box while it is partly attached to the wall, and still open, prior to assembling the balance of the parts thereof. Also the box may be shipped in knockdown condition, thereby saving considerable freight charges.

These objects and other advantages, as will appear from the following description, I accomplish by that certain construction and arrangement of parts to be hereinafter more specifically pointed out and claimed.

In the drawings,

Figure 1 is a perspective view of the box complete.

Figure 2 is a longitudinal section thereof, showing the lid slightly removed from place on the box.

Figure 3 is a detail section of the spring catch for the sliding lid, taken on the line 4, 4, of Figure 4.

Figure 4 is a bottom plan view of the lid.

Figure 5 is a plan view of the switch mechanism.

In the embodiment of my invention shown in the drawings for illustrative purposes, the container proper is formed up in a three-sided structure having a base 1 and sides 2 and 3. A little forward of the center line of the box, at the ends, there are formed on the sides the tongues 4, 4, one of which as at 5 is longer than the rest to serve as a sealing or locking plate for the switch, as will be described. The base is turned up to form flanges 6, 6, at each end for holding the end pieces. The ends of the box comprise a plain lower end 7 which fits under the flange 6, and engages over the outside of the sides 2 and 3 by means of flanges 8, 8. Cut in the ends 7 are slots to permit the passage of the tongue 4 at one side and the special tongue 5 at the other.

The end now described forms the bottom of the box when it is secured against a wallboard or the like, with the base of the box forming the part that is secured to the wall.

The top of the box is formed of a plate 9, which fits down inside of the flange 6, and engages over the sides 2, 3, by means of flanges 10. There are slots in this piece also for the two tongues 4 at the upper end of the box.

There is a cut-away opening 11 in the top which provides a passage for wires from the interior of the box to a meter "adapter" or casing. The metal of the piece is bent over in forming this hole 11 so as to form a locking abutment flange 13 for the meter adapter and slideways 14, 14, beneath which the adapter is moved into place, and which then hold it down firmly against the top 9, over the hole 11 therein.

This adapter is made of two pieces. The main portion is a three-sided stamping having a back 15 and two sides 16, 16. The exact relation of adapter and box forms no part of the invention in this application and reference is made to my application, above noted, for a description thereof.

The fuses 25, which may be of any type usually employed for electric lighting, electric motors and the like are mounted on a plate 26 in the usual manner. This plate is supported on a stamping which is set into the box and locks the meter adapter in place, as described in my former application.

Located in the base of the box is a switch block 33ª, having bifurcated switch points 34, 34, and 35, 35. An ordinary double switch blade 36 is hinged between the points 34, 34, of the switch and closes by swinging upwardly into contact with the points 35.

Mounted in the side of the box is a small stub shaft 37 operated by a handle 38 exterior of the box. This shaft connects with a yoke 39 that extends across the box over the switch. The switch operator has a long loop 40 of suitable wire or the like, to form a slotted member to engage over the yoke at its central portion. When the handle is turned, the yoke 39 will swing upwardly or downwardly as the case may be. The loop on the switch blade runs about parallel with the blade and thus the first part of the motion of the yoke will move the blade but slightly. When the yoke has passed the center of its motion and begins to bear down against the switch blade, it will cause the blade to swing down into contact. On reversing the handle, the opposite will occur and the switch contact will be broken before the yoke has made but a small proportion of its movement.

The lid for the box comprises a body portion 41 having flanges 42 around all four sides for lapping the sides and ends of the box proper. At the central portion of the flange, at the upper end of the lid, is a reentrant tongue 43, that when the lid is set in place is inserted in a slot 44 in the upper end plate of the box. An outwardly extending tongue 45 is provided on the lower end piece of the box and the lid is slotted to come down over this tongue.

A padlock can be inserted in the eye 46 of the tongue 45, which will lock the lid in place. The lid holds the upper end piece against removal, which holds the meter adapter. The lower end piece is held also by the padlock and tongue, so that a box completely locked together is formed, without brazing or soldering, with the parts interlocked and easily assembled. When it is considered that wiring may be done in this box, after it has been installed on the wall and the box then put together, the value of the knockdown structure is further apparent. Also the sides of the main container portion are springy enough to be nested such that the box may be shipped knockdown with a considerable economy.

As so far described, the box has within it a switch, and a separate compartment for fuses, cut off from the switch altogether and lifted off the base of the box entirely. The lid when closed is adapted to cut off the switch entirely from accessibility, but an opening 47 is formed in the lid to give access to the fuses.

Running along the edges on the under side of the lid are two guide flanges 48, 48, formed of metal strips bent lengthwise and screwed up against the under face of the lid. Running in these guides is a sliding shutter 49 for the opening 47. The shutter has depending fingers 50, 50, at each side which lie in the path of the yoke 39. When the yoke is swung upwardly, the fingers 50, 50, are thrust upwardly and the shutter is moved over the opening 47. When the yoke is retracted, the fingers are free to fall and bring the shutter to open position.

The dimensions of the shutter are such that it will be in position to close the opening when the yoke is about midway of its movement. The switch is then closed with but slight movement of the lid. The lost motion in the loop that is attached to the switch bar permits the extended motion of the lid without equally affecting the switch, since the yoke transmits motion on a much longer line to the shutter than to the switch bar. The final downward movement of the yoke which accomplishes the closing of the switch does not, as has been noted, impart much movement to the shutter.

If it is desired that the opening of the switch move the shutter positively downward, it is then necessary to provide a slot 51 for the fingers 50, and to place the yoke in engagement with the slot when assembling the box. The fingers are on the sides of the shutter and hence do not interfere with the switch bar movement.

When the slots 51 are not used, a device is preferably provided for holding the fuse cover or shutter in closed position after it has been freed for downward movement by the opening of the switch. This in its most simple form comprises a small spring plate 52 mounted along one of the shutter guides, and projecting into the path of a turned over tab 53 on the shutter. A button 54 is set into the lid, and has a knob 55 on its outer end on the outside of the lid. The button lies between the lid and the spring plate, and pushing on the knob raises the plate out of position of engagement under the tab 53 on the shutter.

For retaining the lid in place in case it should be forgotten to padlock the same to the tongue 45, it is preferred to have a spring catch. Preferably a bent finger 55ª is mounted on the inside of the lower end piece of the box. This finger projects through the end piece, and has a second extension 56 through the end of the box for a release. The flange of the lid has a hole 57 therein into which the projecting portion of the pin will engage automatically when the lid is thrust home over the box.

Should it be desired to permanently ground the meter adapter to the body of the box against all chance of insulating due to the japanning on the metal, a screw 58 may be turned into the adapter shell at any desired point.

One of the advantages of the structure desired is that it will permit of doing away altogether with the complicated and expensive wiring for meter boards in installations in apartment and office buildings. All that is needed for a number of installations is a number of the boxes. They may be set side by side and the service mains run through the row of boxes, through the holes 59, in the sides of the boxes. The fuse compartments are removable and raised from the bases of the boxes so that the space through the boxes is an enclosed wire gutter which is readily available. The meters will be set in the adapters in each box, and as many more boxes as are desired may be set in line.

The removability of the fuse chambers, and the fact that they are raised from the base of the box greatly facilitates wiring up the switch and the fuses and meter from the box. The removable ends and lid permit the binding posts on the switch to be reached easily, which is not the case in safety boxes which have been brought to my attention.

Then again the boxes may be made up with or without the meter adapter without departing from the construction of the rest of the box, and also the ends will be interchangeable so that the meter adapter can be put on either end of the box as desired.

The great economy of the box, its ready locking facilities and easy installation resulting from the knockdown structure and the arrangement of parts make it a valuable electric installation device, in place of the usual nonprotective switch, without taking into consideration the protection against shock in removal of fuses, and the prevention of theft of current.

From the point of view of perfection of mechanical details of the device, it should be noted that the crank works direct on the yoke which itself is permanently connected to the switch, such that no reliance is had on sliding switch closing bars, or connections from the shutter to the switch bar which might result in a partial closing of the switch and its attendant dangers. In closing a shutter, one pulls it shut, and feels that this is sufficient, but a crank will be turned as far as it will go.

When the switch handle is locked down and the switch is open, the fuses may still be covered up by the shutter so as not to be exposed in an unsightly manner.

It should be noted that it is not essential that the fuse mounting means shall be the one that is removable from the box so as to provide the wire gutter that is available for further connections, since the switch member might be the removable one. At this time I cannot see the possibility of complying with proper practice and still placing the switch in a removable, raised shell or compartment member, and accordingly do not show or describe this as a modification of my invention.

Having thus described my invention, what I claim as new and desire to secure by Letters Patent, is:—

1. In a safety box for electrical installations a box, a switch and a fuse in the box, a movable lid on the box giving access to the interior thereof, an opening in the lid giving access to the fuse only, a shutter for said opening slidably mounted adjacent to and in the plane of the opening, an operating handle for the switch external to the box, a projection from the shutter, and means within the box connected operably with the handle and adapted to contactually engage the shutter projection to prevent its operation when the switch is closed, said shutter projection also preventing the closing of the switch when the shutter is open, said shutter and projection being so proportioned that both ends of the shutter overlap the two ends of the lid opening when the switch is closed and the projection on the shutter and means operated by the handle being free of interlocking engagement whereby the switch may be opened without opening the fuse shutter, said box having a releasable latch for holding the shutter closed when the switch is open.

2. In a device of the character described, the combination with a box, a switch in said box, a blade for said switch, a fuse access opening in the box, a closure therefor, a yoke in said box, said yoke being adapted to engage the closure, and a slotted engagement member on the switch blade for said yoke, whereby the movement of the yoke will close the shutter well ahead of the closing of the switch.

3. In a device of the character described, the combination with a box, a switch in said box, a closing blade for said switch, a fuse access opening in the box, a closure therefor, a yoke in said box, said yoke being adapted to engage the closure, and a slotted engagement member on the switch blade for said yoke, whereby the movement of the yoke will close the shutter well ahead of the closing of the switch, said engagement of the yoke and the closure comprising depending fingers on the closure for contact with the yoke, said fingers being slotted, whereby the yoke may be set into positive engagement or merely contactual engagement with the fingers and hence the shutter.

4. In an electric switch, the combination with a cabinet, of knife blade switch, a fuse compartment, a sliding door to the fuse compartment, an operating member for the switch in the nature of a bail, means exterior of the box for revolving the bail, a member on the sliding door adapted to be controlled in its position by the bail movement, and a member on the blade portion of the switch having an elongated slot in which the bail engages, whereby additional movement of the bail may be provided after the switch blade is closed.

5. In an electric switch, a cabinet, a switch therein having a blade, an operating member for the blade having its ends pivoted in the sides of the box and otherwise formed into a bail to straddle the switch and a piece fixed non-slidably on the blade having an elongated slot to engage the straddling portion of the operating member centrally thereof, said bail and blade so arranged that the slot acts as a cam to require the bail to pass through a greater arc to effect complete closure of the switch blade, than in effecting a like movement when bringing it into position ready for contact.

6. In an electric switch, a cabinet, a switch therein having a blade, an operating member for the blade having its ends pivoted in the sides of the box and otherwise formed into a bail to straddle the switch and a piece fixed non-slidably on the blade having an elongated slot to engage the straddling portion of the operating member centrally thereof, said piece on the blade being located centrally thereof, said bail and blade so arranged that the slot acts as a cam to require the bail to pass through a greater arc to effect complete closure of the switch blade, than in effecting a like movement when bringing it into position ready for contact.

7. In combination, a switch cabinet, a switch therein having a blade, a compartment forming element to render the switch inaccessible from the fuse portion of the box, and means for operating the blade so as to take a vertical position and a position parallel to the base of the box, comprising a bail-like member adapted to engage an elongated slotted portion of the blade, and a handle portion exterior of the box for operating the bail-like member, said movement from vertical position to parallel position being in a direction toward the compartment forming element, a movable cover to disclose the fuses in said compartment forming element without disclosing the switch, and an interlock between the blade operating means and the said cover, said switch and the compartment forming element so arranged that one lies above the other within said cabinet.

GEORGE B. WADSWORTH.